United States Patent
Haim (10) Patent No.: US 7,386,011 B2
(45) Date of Patent: Jun. 10, 2008

(54) RECEIVING STATION FOR CDMA WIRELESS SYSTEM AND METHOD

(75) Inventor: John W. Haim, Baldwin, NY (US)

(73) Assignee: Interdigital Technology Corporation, Wilmington, DE (US)

( * ) Notice: Subject to any disclaimer, the term of this patent is extended or adjusted under 35 U.S.C. 154(b) by 933 days.

(21) Appl. No.: 10/417,586

(22) Filed: Apr. 17, 2003

(65) Prior Publication Data

US 2003/0198210 A1    Oct. 23, 2003

Related U.S. Application Data

(60) Provisional application No. 60/374,018, filed on Apr. 19, 2002.

(51) Int. Cl.
    *H04J 3/16* (2006.01)
(52) U.S. Cl. ........................ 370/471; 370/476
(58) Field of Classification Search ................ 370/431, 370/437, 441, 442, 458, 464, 479, 471, 473, 370/474, 476, 470, 535, 506
    See application file for complete search history.

(56) References Cited

U.S. PATENT DOCUMENTS

| 6,501,748 B1 | 12/2002 | Belaïche | |
| 6,967,970 B2 * | 11/2005 | Terry et al. | 370/458 |
| 2001/0024451 A1 | 9/2001 | Le Strat et al. | |
| 2003/0086379 A1 * | 5/2003 | Terry et al. | 370/279 |

OTHER PUBLICATIONS

3GPP TS 25.222 V3.8.0, 3rd Generation Partnership Project, Multiplexing and Channel Coding, Mar. 2002.
3GPP TS 25.223 V3.8.0, 3rd Generation Partnership Project, Spreading and Modulation, Mar. 2002.
3GPP TS 25.221 V3.11.0, 3rd Generation Partnership Project, Physical Channels and Mapping of Transport Channels Onto Physical Channels, Sep. 2002.
3GPP TS 25.224 V3.12.0, 3rd Generation Partnership Project, Physical Layer Procedures, Dec. 2002.

* cited by examiner

*Primary Examiner*—Brenda Pham
(74) *Attorney, Agent, or Firm*—Volpe and Koenig PC (57) ABSTRACT

In a communication station, such as a UE or Node B of a 3GPP system, where channelization coded signals are received on physical channels of at least one coded composite transport channel (CCTrCh) within timeslots of a system time frame, the actual number of channelization codes transmitted for the CCTrCh within a system time frame is determined. The transmitted channelization codes are then identified by performing a channelization code identification algorithm based on the determined number.

22 Claims, 6 Drawing Sheets

RECEIVING STATION FOR CDMA WIRELESS SYSTEM AND METHOD

CROSS-REFERENCE TO RELATED APPLICATION

This application claims priority from U.S. Provisional Application No. 60/374,018, filed Apr. 19, 2002 which is incorporated by reference.

FIELD OF INVENTION

The present invention relates to receiving stations for CDMA wireless communication systems and, in particular, systems which utilize sets of channelization codes in connection with the transmission of selectively sized data blocks for wireless transport of data.

BACKGROUND OF THE INVENTION

Figure 1:
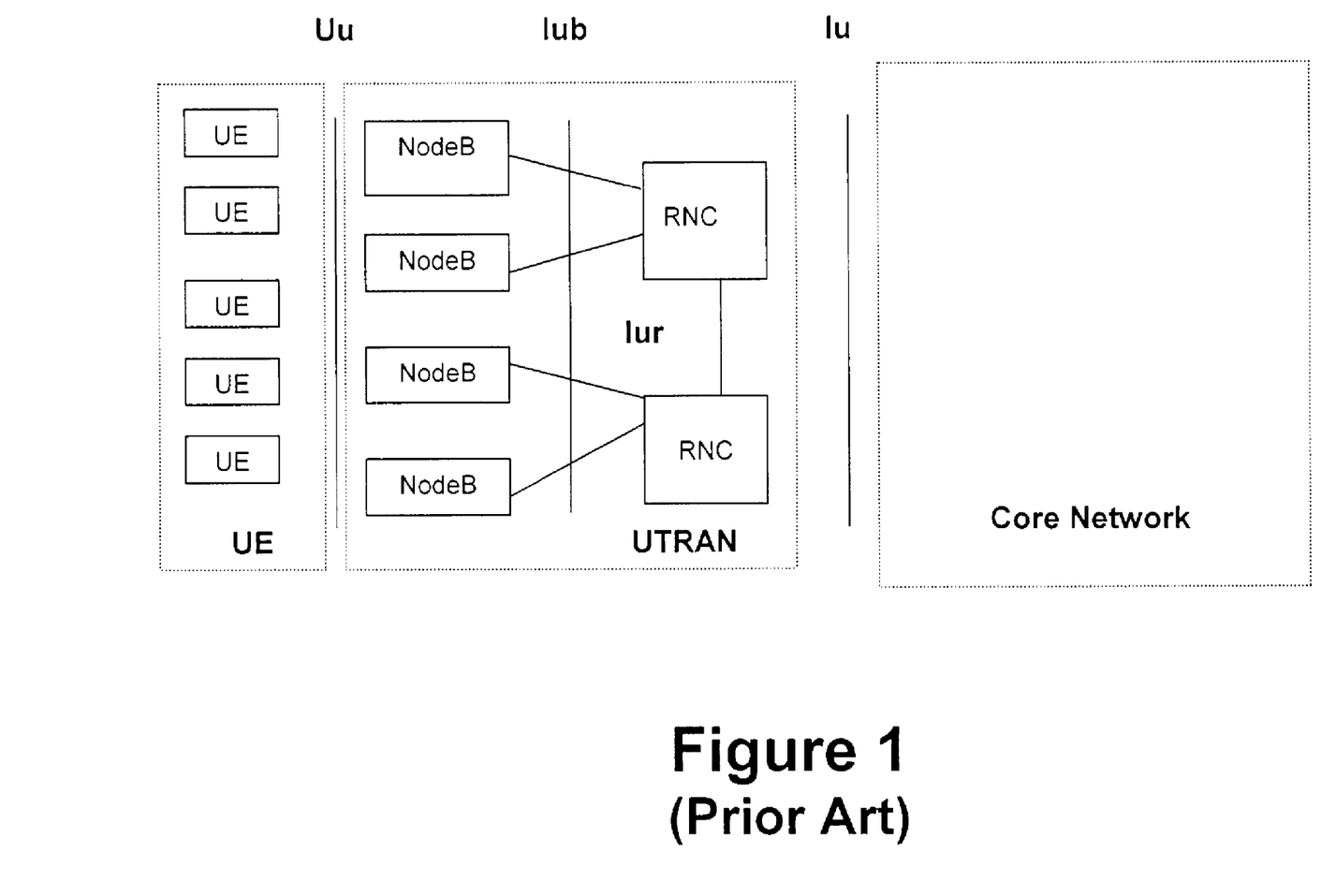
FIG. 1 is a schematic diagram of a typical CDMA system in accordance with current 3GPP specifications.

Wireless communication systems are well known in the art. Generally, such systems comprise communication stations which transmit and receive wireless communication signals between each other. Typically, base stations are provided which are capable of conducting wireless concurrent communications with a plurality of subscriber stations. In CDMA systems specified by the Third Generation Partnership Project (3GPP), base stations are called Node Bs, subscriber stations are called User Equipments (UEs) and the wireless interface between the Node Bs and UEs is known as the Uu interface. FIG. 1 illustrates a typical 3GPP CDMA system.

The Uu radio interface of a 3GPP system uses Transport Channels (TrCHs) for transfer of user data and signaling between UEs and Node Bs. In 3GPP Time Division Duplex (TDD) communications, TrCH data is conveyed by one or more physical channels defined by mutually exclusive physical resources. TrCH data is transferred in sequential groups of Transport Blocks (TBs) defined as Transport Block Sets (TBSs). Each TBS is transmitted in a given Transmission Time Interval (TTI) which may span a plurality of consecutive system time frames. A typical system time frame is 10 microseconds and TTIs are currently specified as spanning 1, 2, 4 or 8 of such time frames.

Figure 2A:
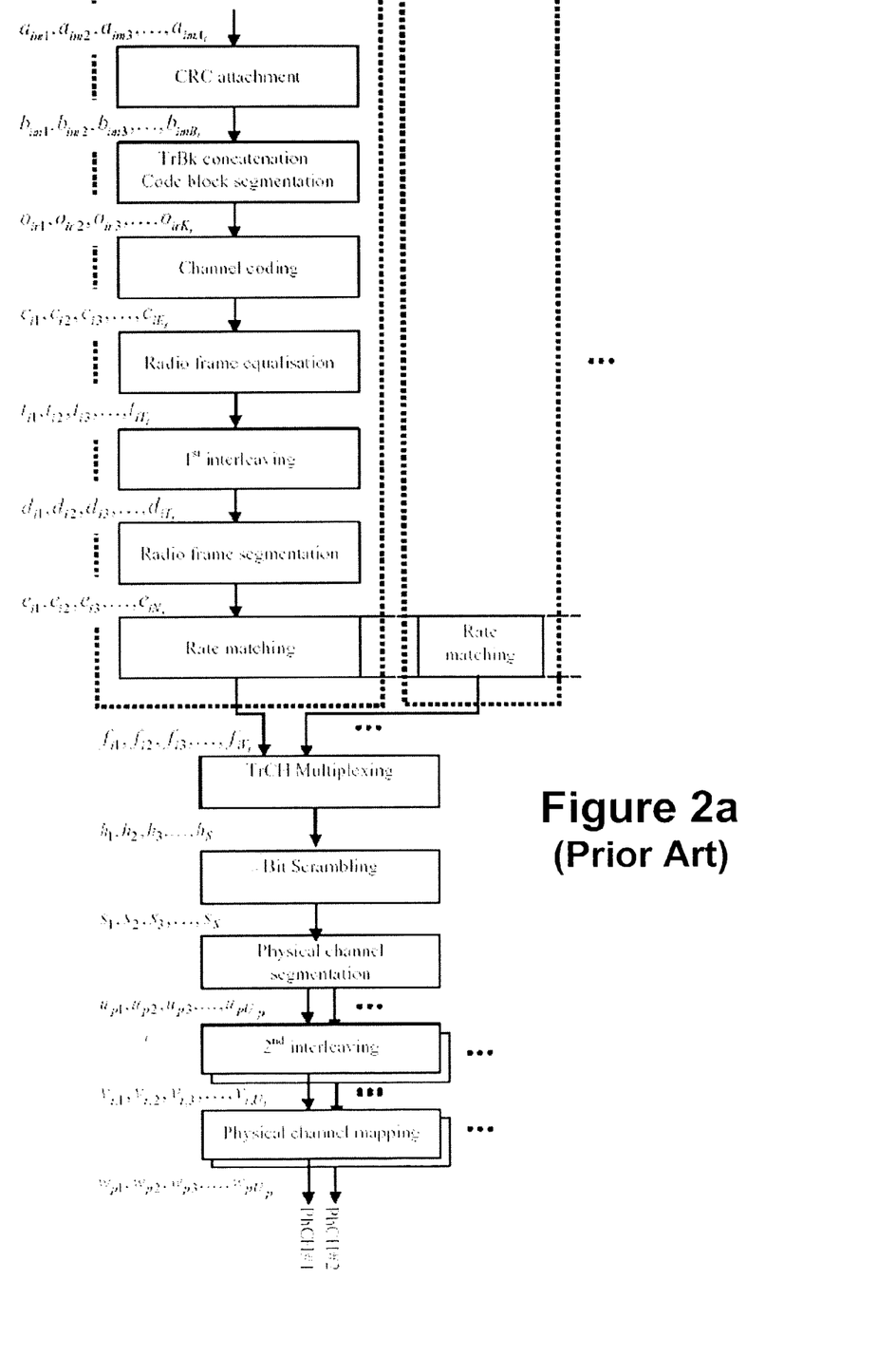
FIG. 2a is a processing diagram of TrCH data for a CCTrCH in accordance with 3GPP TDD specifications.

FIG. 2a illustrates the processing of TrCHs in TTD mode into a Coded Composite TrCH (CCTrCH) and then into one or more physical channel data streams in accordance with 3GPP TS 25.222 v3.8.0. Starting with the TBS data, Cyclic Redundancy Check (CDC) bits are attached and Transport Block concatenation and Code Block segmentation is performed. Convolution coding or turbo coding is then performed, but in some instances no coding is specified. The steps after coding, include radio frame equalization, a first interleaving, radio frame segmentation and rate matching. The radio frame segmentation divides the data over the number of frames in the specified TTI. The rate matching function operates by means of bit repetition or puncturing and defines the number of bits for each processed TrCH which are thereafter multiplexed to form a CCTrCH data stream.

The processing of the CCTrCH data stream includes bit scrambling, physical channel segmentation, a second interleaving and mapping onto one or more physical channels. The number of physical channels corresponds to the physical channel segmentation. For uplink transmissions, UE to Node B, the maximum number of physical channels for transmission of a CCTrCH is currently specified as two. For downlink transmissions, Node B to UEs, the maximum number of physical channels for transmission of a CCTrCH is currently specified as sixteen. Each physical channel data stream is then spread with a channelization code and modulated for over air transmission on an assigned frequency.

In the reception/decoding of the TrCH data, the processing is essentially reversed by the receiving station. Accordingly, UE and Node B physical reception of TrCHs require knowledge of TrCH processing parameters to reconstruct the TBS data. For each TrCH, a Transport Format Set (TFS) is specified containing a predetermined number of Transport Formats (TFs). Each TF specifies a variety of dynamic parameters, including TB and TBS sizes, and a variety of semi static parameters, including TTI, coding type, coding rate, rate matching parameter and CRC length. The predefined collection of TFSs for the TrCHs of a CCTrCH for a particular frame is denoted as a Transport Format Combination (TFC).

Receiving station processing is facilitated by the transmission of a Transport Format Combination Indicator (TFCI) for a CCTrCH. For each TrCH of a particular CCTrCH, the transmitting station determines a particular TF of the TrCH's TFS which will be in effect for the TTI and identifies that TF by a Transport Format Indicator (TFI). The TFIs of all the TrCHs of the CCTrCH are combined into the TFCI. For example, if two TrCHs, TrCH1 and TrCH2, are multiplexed to form CCTrCH1, and TrCH1 has two possible TFs, $TF_1 0$ and $TF_1 1$, in its TFS and TrCH2 has four possible TFs, $TF_2 0$, $TF_2 1$, $TF_2 2$, and $TF_2 3$, in its TFS, valid TFCIs for CCTrCH1 could include (0,0), (0,1), (1,2) and (1,3), but not necessarily all possible combinations. Reception of (1,2) as the TFCI for CCTrCH1 informs the receiving station that TrCH1 was formatted with $TF_1 1$ and TrCH2 was formatted with $TF_2 1$ for the received TTI of CCTrCH1.

3GPP optionally provides for "blind transport format detection" by the receiving station, in which case the receiving station considers the potential valid TFCIs. Where there is only one valid TFCI, that TFCI is used in either case.

Figure 2B:
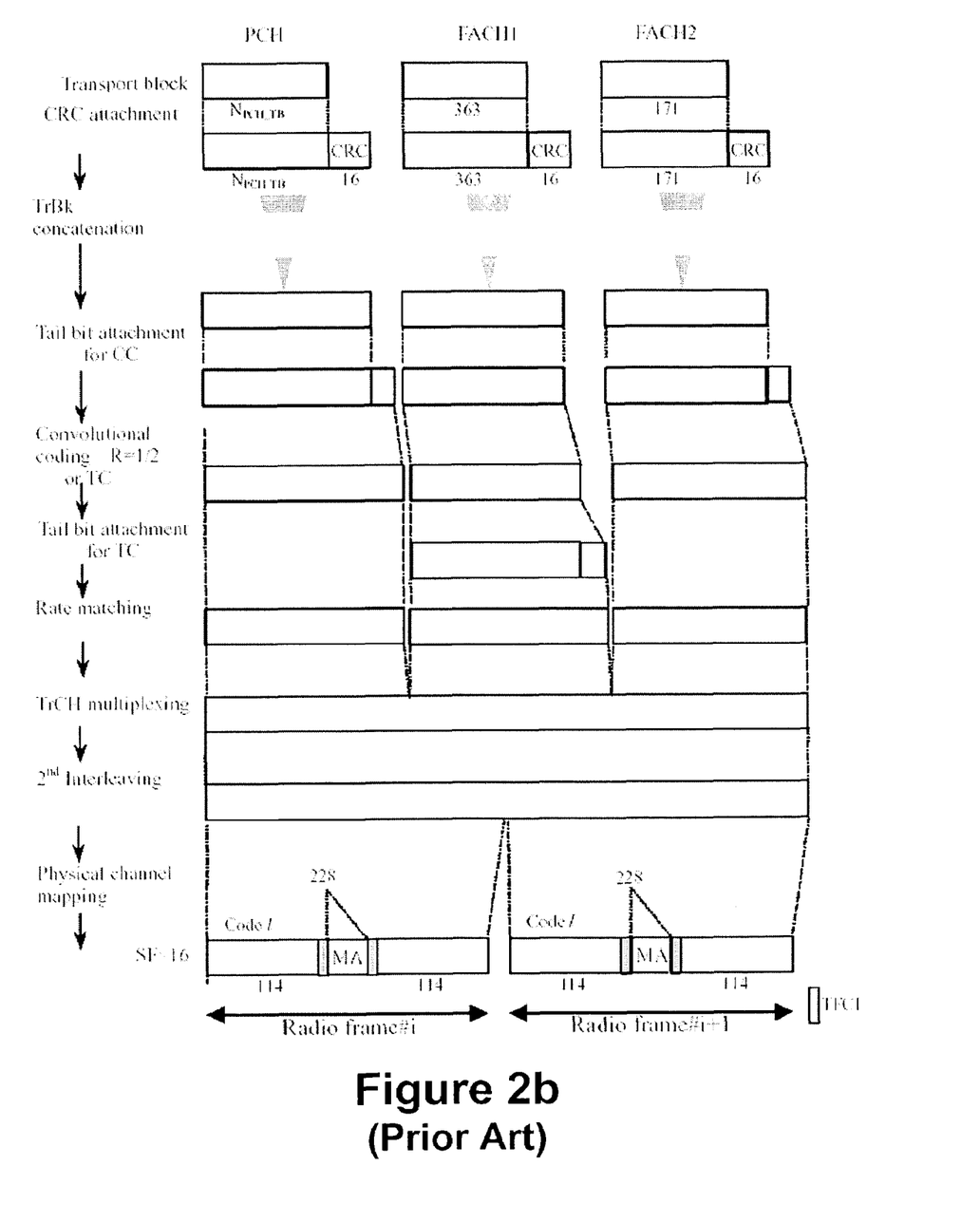
FIGS. 2b and 2c are diagrams of channel coding and multiplexing examples in accordance with 3GPP TDD specifications.
Figure 2C:
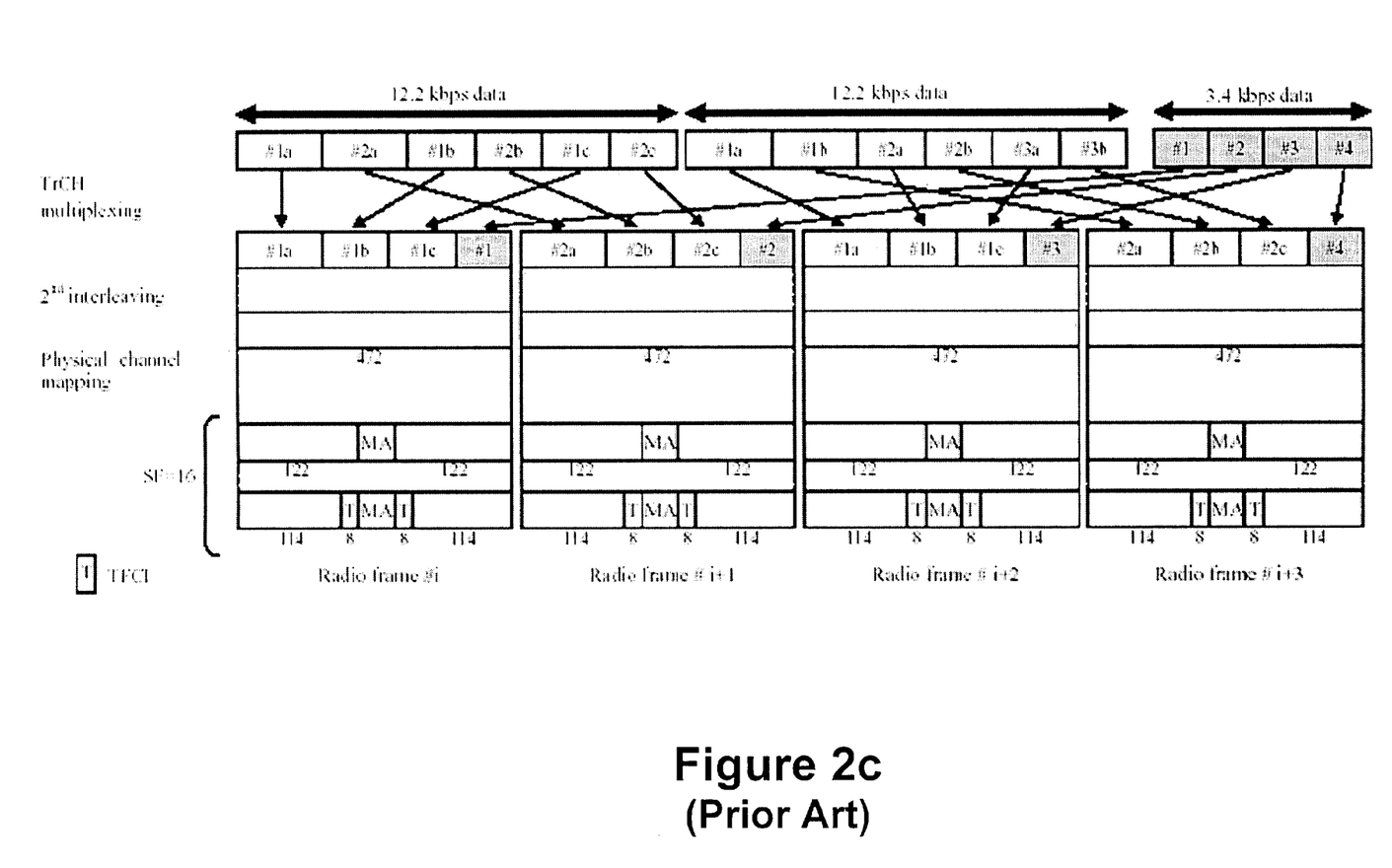

In 3GPP, time slot transmissions are made in predefined bursts where the transmitted physical channel data is divided into a beginning time slot portion and an ending time slot portion. A selected midamble is included between the two physical channel data portions. The TFCI is currently specified as transmitted in two parts on either side of the midamble and also between the two physical channel data portions. Two examples from 3GPP TR 25.944 V3.5.0 are illustrated in FIGS. 2b and 2c respectively where the block labeled MA represents the midamble and the block labeled T represents the parts of the TFCI. In second example, FIG. 2c, the CCTrCH is mapped to two physical, but only one physical channel includes the TFCI.

The midamble and TFCI are initially processed and then the results can be used to process the physical channel data. There is a brief period of time between reception of a TFCI and the end of both the time slot and the time frame in which it is received which the inventor has recognized can be efficiently used for processing the TFCI.

In 3GPP TDD mode, for each radio frame and for each CCTrCH with physical channels or channelization codes allocated in the frame, the transmitter (Node B or UE) autonomously determines the number of bits, denoted $N_{data}$, to be transmitted in the frame based on the TFC in effect for the frame. The 3GPP algorithm in accordance with TS 25.222 v4.0.0, part 4.2.7.1 is in pertinent part as follows:

Denote the number of data bits in each physical channel by $U_{p,Sp}$, where p refers to the sequence number $1 \leq p \leq P_{max}$ of this physical channel, and the second index Sp indicates the spreading factor with the possible values {16, 8, 4, 2, 1}, respectively. For each physical channel, an individual minimum spreading factor $Sp_{min}$ is transmitted by means of the higher layers. Then, for $N_{data}$ one of the following values in ascending order can be chosen:

$$\{U_{1,S1_{min}}, U_{1,S1_{min}} + U_{2,S2_{min}}, U_{1,S1_{min}} + U_{2,S2_{min}} + \ldots + U_{P_{max},(SP_{max})_{min}}\}$$

Optionally, if indicated by higher layers for the UL the UE shall vary the spreading factor autonomously, so that $N_{data}$ is one of the following values in ascending order:

$$\left\{ \begin{array}{l} U_{1,16}, \ldots, U_{1,S1_{min}}, U_{1,S1_{min}} + U_{2,16}, \ldots, U_{1,S1_{min}} + \\ U_{2,S2_{min}}, \ldots, U_{1,S1_{min}} + U_{2,S2_{min}} + \ldots + \\ U_{P_{max},16}, \ldots, U_{1,S1_{min}} + U_{2,S2_{min}} + \ldots + U_{P_{max},(SP_{max})_{min}} \end{array} \right\}$$

$N_{data,j}$ for the transport format combination j is determined by executing the following algorithm:

$$SET1 = \left\{ N_{data} \text{ such that } \left( \min_{1 \le y \le I} \{RM_y\} \right) \times N_{data} - PL \times \sum_{x=1}^{I} RM_x \times N_{x,j} \text{ is non negative} \right\}$$

$$N_{data,j} = \min SET1$$

Implicit in the above is that only a subset of allocated physical channels is transmitted in the frame. The receiver (BS or UE) can exploit the knowledge of transmitted codes (whether from the signaled TFCI or blindly detected) to improve performance.

To use the signaled TFCI to determine the identity of the transmitted codes, two obvious methods can be applied:

1. upon receipt of a TFCI, the inverse of the 3GPP transmission processing algorithms described in TS 25.222 can be used to:
   a. determine transport block set size after CRC(s) are appended;
   b. determine code block number and size and number of filler bits;
   c. determine number of bits after coding;
   d. determine size of frame size after equalization (before rate matching); and
   e. determine frame size (number of transmitted bits) after rate matching;

in order to determine the identity of the transmitted codes, or 2. pre-compute and store along with the TFC the identity of the transmitted codes.

The first method requires that computations necessary to determine the identity of the transmitted codes be performed upon receipt of the TFCI, but before other received data in the frame is demodulated. The second method does not require the computation in real time of the identity of transmitted codes but does require storage of the identity of up to 136 transmitted codes for each of up to 1024 TFCs.

The inventor has recognized that a third, non-obvious method can be implemented which entails less processing without the need for pre-computing and storing all of the channelization codes.

SUMMARY OF THE INVENTION

In a communication station, such as a UE or Node B of a 3GPP system, where channelization coded signals are received on physical channels of at least one coded composite transport channel (CCTrCh) within timeslots of a system time frame, the actual number of channelization codes transmitted for the CCTrCh within a system time frame is determined. The transmitted channelization codes are then identified by performing a channelization code identification algorithm based on the determined number. Preferably, the identified channelization codes are stored in a code list by first ordering all channelization codes that are allocated and selecting codes in order from the code list until the calculated and stored number of transmitted codes is reached.

Typically, each transmitted CCTrCH is comprised of a selected number of Transport Channels (TrCHs). Each TrCH has a data stream arranged in a predetermined Transport Format (TF) of a Transport Format Set (TFS) of that TrCH which is in effect for a given Transmission Time Interval (TTI) of timeframes. A Transport Format Indicator (TFI) identifies the TF of the TrCH's TFS in effect for the particular TrCH. The TFIs of all the TrCHs of a CCTrCH are combined into a Transport Format Combination Indicator (TFCI) from which the formatting and channelization codes of the transmitted CCTrCH in a given TTI can be determined. The TFCI is transmitted with the corresponding CCTrCH in at least one timeslot of each TTI in which the CCTrCH is transmitted so that the communication station receives a TFCI in conjunction with a CCTrCH in a TTI.

The communication station is preferably configured so that the received TFCI is processed in background processing to determine a value Ncodes representing the number of transmitted channelization codes, The received TFCI is then processed a second time at a timeslot processing rate utilizing the determined value Ncodes to identify a list corresponding to the channelization codes of the CCTrCH in the TTI.

Preferably, a received TFCI is processed to determine a value Ncodes in background processing only if a currently valid value Ncodes has not been determined. Preferably, a received TFCI is processed to identify a list corresponding to the transmitted channelization codes at a timeslot processing rate only if a currently valid value transmitted channelization code list has not been identified. Preferably, a received TFCI is processed at a time frame processing rate to determine demodulation parameters at a time frame processing rate.

In a 3GPP system, either the CCTrCHs are transmitted by a Node B and the CCTrCHs and corresponding TFCIs are received and processed by a User Equipment (UE) or the CCTrCHs are transmitted by a User Equipment (UE) and the CCTrCHs and corresponding TFCIs are received and processed by a Node B.

In a preferred embodiment, the communication station, either a UE or a Node B of a 3GPP system, is configured to receive channelization coded signals on physical channels of at least one coded composite transport channel (CCTrCh) within timeslots of a system time frame. Each transmitted CCTrCH is comprised of a selected number of Transport Channels (TrCHs). Each TrCH has data streams arranged in a predetermined Transport Format (TF) of a Transport Format Set (TFS) of the TrCH which is in effect for a given Transmission Time Interval (TTI) of timeframes. A Transport Format Indicator (TFI) identifies the TF of the TrCH's TFS in effect for that TrCH. The TFIs of all the TrCHs of a CCTrCH are combined into a Transport Format Combination Indicator (TFCI) from which the formatting and channelization codes of the transmitted CCTrCH in a given TTI can be determined and the TFCI is transmitted with the corresponding CCTrCH in at least one timeslot of each TTI in which the CCTrCH is transmitted.

The communication station has a receiver that includes a TFCI processing component. The TFCI processing component preferably has a first section configured to process received TFCIs to produce a value representing the number of transmitted channelization codes of a corresponding CCTrCH. The TFCI processing component preferably has a second section configured to process received TFCIs using the values produced by said first section to identify a list of the transmitted channelization codes for each corresponding CCTrCH. A memory is associated with the TFCI processing component such that the first section stores the produced values representing the number of transmitted channelization codes in the memory and those values are retrieved from the memory for use by the second section.

Preferably, the first section of the TFCI processing component is configured to process received TFCIs in background processing such that at least 50 values can be produced in a given time frame and the second section is configured to process received TFCIs at a timeslot processing rate. The TFCI processing component preferably has a third section configured to process received TFCIs to produce demodulation parameters for each corresponding CCTrCH at a time frame processing rate.

Other objects and advantages will be apparent to those skilled in the art from the following detailed description.

TABLE OF ACRONYMS

| | |
|---|---|
| 3GPP | Third Generation Partnership Project |
| BCD | Blind Code Detection |
| BS | Base Station |
| CCTrCH | Coded Composite Transport Channel |
| CDMA | Code Division Multiple Access |
| CRC | Cyclic Redundancy Check |
| DL | Downlink (Node B to UE) |
| DTX | Discontinuous Transmission |
| Iu | Interface between UTRAN and Core Network |
| Iub | Interface between Node Bs and RNC |
| Iur | Interface between RNCs |
| MUD | Multi-User Detection |
| Nbits | Number of Bits In a Radio Frame For a TrCH |
| Ncodes | Number of Channelization Codes for a TTI of a CCTrCH |
| Ndata | Number of Bits In a Radio Frame For a CCTrCH |
| Node B | 3GPP Base Station |
| PhCH | Physical Channel |
| RNC | Radio Network Controller |

-continued

TABLE OF ACRONYMS

| | |
|---|---|
| SUD | Single User Detection |
| rxTFCI | received Transport Format Combination Indicator |
| TB or TrBk | Transport Block |
| TDD | Time Division Duplex |
| TF | Transport Format |
| TFC or tfc | Transport Format Combination |
| TFCI | Transport Format Combination Indicator |
| TFI | Transport Format Indicator |
| TFS | Transport Format Set |
| TPC | Transmit Power Control |
| TrCH | Transport Channel |
| TTI | Time Transmission Interval |
| UE | User Equipment |
| UL | Uplink (UE to Node B) |
| UMTS | Universal Mobile Telecommunications System |
| UTRAN | UMTS Terrestrial Radio Access Network |
| Uu | Interface between UEs and UTRAN Node Bs |

DETAILED DESCRIPTION OF THE PREFERRED EMBODIMENT(S)

A wireless communication station, such as a User Equipment (UE) or a base station, Node B, is provided for use in a CDMA communication system, such as the 3GPP system illustrated in FIG. 1. Each station includes a receiver configured to receive selectively formatted, encoded TDD wireless communication signals. Preferably, a system time frame format is established with each frame being 10 microseconds in duration with 15 time slots per time frame wherein timeslots can be used for either uplink (UL), UE to Node B, or downlink (DL), Node B to UE, communication signals during a given time period.

As described above, Transport Channels (TrCHs) are used for the transfer of user data and signaling between UEs and Node Bs. Multiple TrCHs are multiplexed into a Coded Composite TrCH (CCTrCH). The CCTrCH data stream is mapped onto one or more physical channel data streams which are encoded with channelization codes, preferably Orthogonal Variable Spreading Factor (OVSF) codes.

For each TrCH of a particular CCTrCH, the transmitting station determines a particular Transport Format (TF) of the TrCH's Transport Format Set (TFS) which will be in effect for a given Transmission Time Interval (TTI) and identifies that TF by a Transport Format Indicator (TFI). The TFIs of all the TrCHs of the CCTrCH are combined into a Transport Format Combination Indicator (TFCI) from which the formatting and channelization codes of the transmitted signals can be determined.

Figure 3:
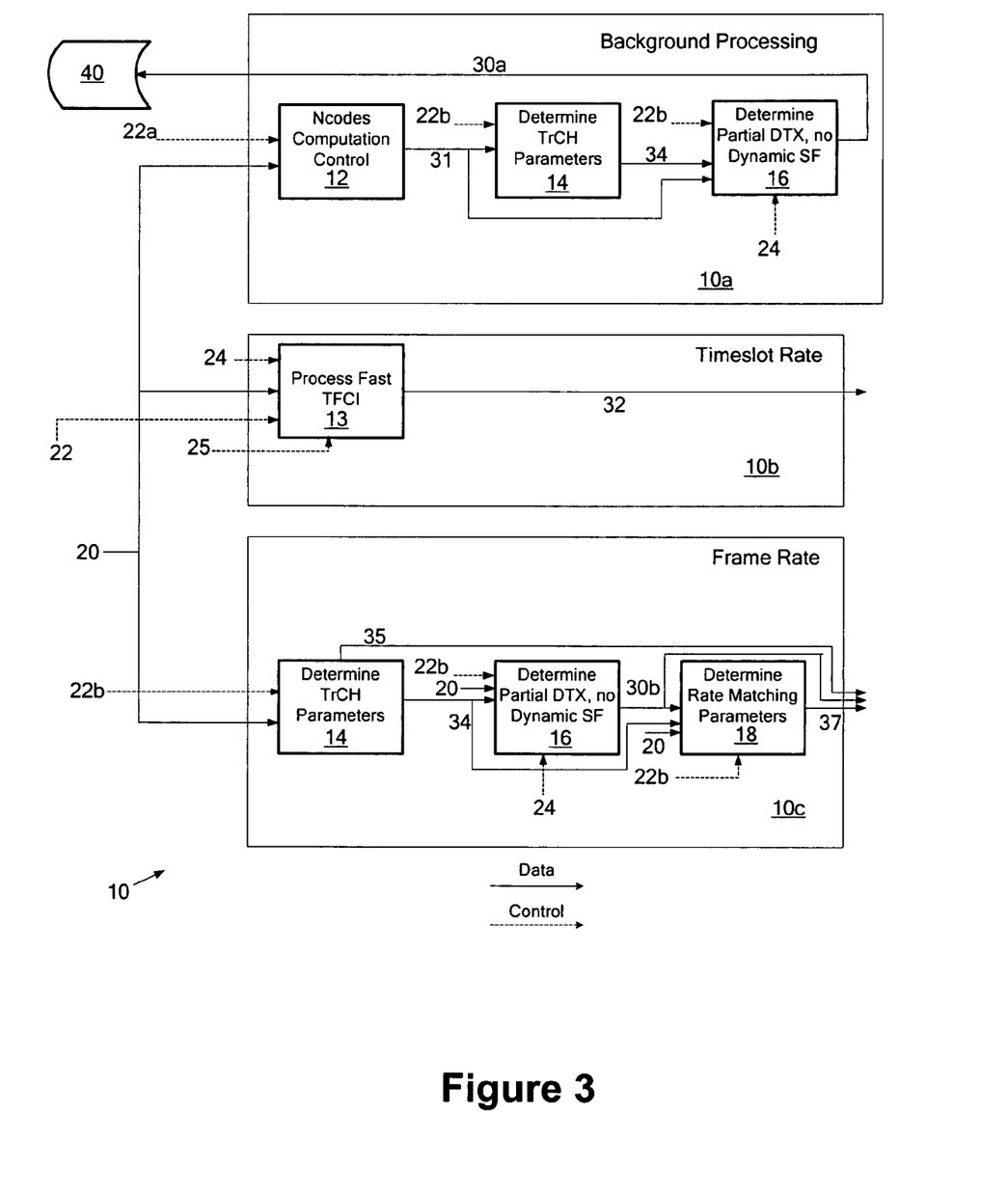
FIG. 3 is a block diagram of a receiving portion of a communication station made in accordance with the teachings of the present invention.

Referring to FIG. 3, a TFCI processing component 10 for the receiver of a communication station, such as a UE or Node B, is provided for processing received (Rx) TFCIs in a novel and efficient manner. An intermediate parameter, the number of transmitted physical channels or channelization codes, denoted Ncodes is pre-computed or computed on demand and stored with its corresponding TFC parameters. Ncodes can then be looked up per the received TFCI, so that the task to determine the identity of transmitted channelization codes is simplified. Preferably, the identity of transmitted channelization is performed by, timeslot-by-timeslot, counting the number of allocate channelization codes in the allocation order specified in 3GPP for the multiplexing of different TrCH onto one CCTrCH and mapping of one CCTrCH onto physical channels until Ncodes is reached, and declaring that channelization codes in allocation order up to and including Ncodes were transmitted and that all other channelization codes were not transmitted.

The TFCI processing component 10 includes a background processing section 10a, a time slot rate processing section 10b and a frame rate processing section 10c. An input 20 provides the TFCI processing component 10 with decoded TFCIs of the received CCTrCHs. The TFCI processing component 10 processes the received TFCI in the background, at the end of each timeslot and again at the end of each time frame.

The background processing segment 10a determines the intermediate parameter of the number of channelization codes, Ncodes, in use for each CCTrCH received in each TTI. The time slot rate processing section 10b then provides fast TFCI processing to produce the list of the channelization codes using the Ncodes parameter determined in the background section 10a. The frame rate processing section 10c determines the TrCH parameters and rate matching parameters of each TrCH of each received CCTrCH based on the TFCIs in a conventional manner, that are used for demapping and demodulation of the CCTrCHs and their associated TrCHs. FIG. 3 depicts these functions for one CCTrCH. Preferably, these functions are applied to all CCTrCHs.

An associated memory device 40 is provided wherein TFC data is stored that is used in connection with controlling the operation of the TFCI processing component 10. The data stored in the memory device 40 includes values for the novel parameter Ncodes which is computed by the processing component section 10a along with a flag NcodesValid which indicates whether or not Ncodes has been computed for a particular TFCI for a particular TTI.

Preferably the inputs for the processing component 10 includes a data input 20 for the received TFCI for all CCTrCHs which may be designated as rxTFCI[maxCCTrCH] and a control input 22 for TFC related parameters. The TFC control signals received via the control input 22 preferably include:
the number of codes transmitted per frame, per TFCI, per CCTrCH which may be designated as Ncodes[1024, maxCCTrCH],
a flag which is set if the Ncodes value has been computed, per TFCI, which may be designated as NcodesValid [1024, maxCCTrCH],
TFCS parameters, per $TrCH_i$, per CCTrCH, as function of current TFCI including:
Rate Matching Factor
Coding Method
Coding Rate
$L_i$, CRC Length
TFCS parameters, indexed by TFCI, per TrCH per CCTrCH including:
Transport Block Set $Size_i$
Transport Block $Size_i$
$TTI_i$ A second control input 24 provides Physical Channel Map control signals, preferably of length 240 (15 timeslots, 16 codes), of the form:
pcmCodeNumber[240], code number;
pcmTimeslot[240], timeslot of this code;
pcmMinSF[240], minimum spreading factor of this code;
pcmCCTrCH[240], CCTrCH number of this code;
pcmTFCI[240], set if this code contains a TFCI;
burstType[15], burst type of each of the 15 timeslots;
TFCI Format & Map, indicated locations of TFCI bits and length of the TFCI fields;
puncLimit, the puncturing limit; and
timeslotNumber, the current timeslot;

where pcmTFCI[240] is the first code number in the timeslot, in the index order of this list.

The output of the TFCI processing component 10 is time dependent due to its three different processing sections. When invoked in the background, an output 30a of processing section 10a provides data output in the form of:
the number of codes transmitted per frame for this TFCI and CCTrCH, Ncodes[TFCI], and
a signal to set the flag indicating that Ncodes for the TFCI of a CCTrCH has been computed, NcodesValid[TFCI].

When invoked to process the fast TFCI, an output 32 of processing section 10b provides data output in the form of a table of transmitted codes and indicators for all CCTrCHs, as determined by the received TFCI, preferably designated tfcCodeTable[maxCCTrCH] and including:
a list of transmitted codes in the current frame (14 timeslots×16 codes maximum), tfcCodeList[224]; and
a flag that is set if the txCodeList contains valid data, tfcCodeListValid.

When invoked after a frame has been received, three outputs 30b, 35 and 37 of processing section 10c provide data output in the form of:
the number of bits per frame per CCTrCH after rate matching, $N_{data}$, from output 30b;
the number of bits per frame after frame size equalization and before rate matching, for $TrCH_i$, N, or $Nbits_i$, from output 35; and
from output 37, TrCH and Rate Matching parameters, where the TrCH parameters are preferably of the form:
$X1_i$, number of bits for all concatenated transport blocks after CRC insertion, for $TrCH_i$;
$C_i$, number of code blocks, for $TrCH_i$;
$Y1_i$, number of code block filler bits, for $TrCH_i$;
$K_i$, number of bits per code block, before channel coding, for $TrCH_i$;
$Y2_i$, number of bits per code block, after channel coding, for $TrCH_i$;
$E_i$, number of bits per TTI before frame size equalization, for $TrCH_i$; and
$T_i$, number of bits per TTI after frame size equalization, for $TrCH_i$;

and the Rate matching parameters are preferably of the form:
$e\_ini_{i,f,b}$, initial value of e, the rate-matching counter, for frame f, sequence b, for $TrCH_i$;
$e\_plus_{i,b}$, increment value of e, the rate-matching counter, sequence b, for $TrCH_i$;
$e\_minus_{i,b}$, decrement value of e, the rate-matching counter, sequence b, for $TrCH_i$;
$X_{i,b}$, number of bits before rate matching, sequence b, for $TrCH_i$; and
$nMod3_i$, number of first and/or second parity turbo coded bits in the first sequence, for $TrCH_i$.

Preferably, the TFCI processing component is configured based upon two overall operating parameters: the number of received (Rx) CCTrCHs and the background processing capacity for computing Ncodes values. The maximum number of Rx CCTrCHs, which may be designated as maxCTrCH, is preferably set at 4 for UEs and 96 in Node Bs Preferably, the processing section 10a can compute at least 50 Ncodes values in the background, 50 per frame. These preferred values are based upon curren3GPP specifications and can be adjusted when various system operating parameters are changed.

The background processing section 10a includes three processing elements, Ncodes Computation Control 12, TrCH Parameter Determination processing 14 and Partial Discontinuous Transmission (DTX) processing where there is no Dynamic Spreading Factor 16. The latter two processing elements 14, 16 are preferably of conventional design used for preprocessing TFCS control signal based on a particular TFCI to provide required inputs for Rate Matching Parameter processing and accordingly are preferably configured for operation in the Frame Rate processing section 10c as well.

The Ncodes Computation Control 12 includes the rxTFCI input 20 as data and a modified TFC control input 22a which provides the flag signal NcodesValid associated with the particular rxTFCI received via input 20. This processing element 12 controls the computation of Ncodes, for each CCTrCH. For each received TFCI value, if Ncodes has not yet been computed for that TFCI value, i.e. NcodesValid for the TFCI of the CCTrCH is FALSE, Ncodes is computed such that it is available at the start of the next frame. Accordingly the operation of the processing section 10a is preferably controlled such that background processing, i.e., using any available computational resource at no particular time, is used to compute Ncodes:

for all TFCIs of all CCTrCHs until all have been computed;
for the affected TFCI(s) of the CCTrCH when the PhCH associated with the CCTrCH is assigned, configured or reconfigured; and
for the affected TFCI(s) of the CCTrCH assigned to a PhCH when the CCTrCH is assigned, configured or reconfigured.

Preferably sufficient resources are available so that at least 50 Ncodes values may be computed in a given frame and so that Ncodes for a newly received TFCI is computed by the start of the next frame.

The Ncodes Computation Control 12 includes an output 31 which is passed as data to the downstream processing elements 14 and 16 of processing section 10a. The output 31 passes the TFCI and CCTrCH which may be designated as TFCI/CCTrCH, which represent a rxTFCI for which Ncodes needs to be computed. This function operates whenever a TFCI is received and in the background.

The TrCH Parameters Determination element 14 is of conventional design and computes parameters for various TrCH demodulation functions and Nbits, the number of bits before rate matching per TrCH. This function is called in the background section 10a as part of the Ncodes. It is also called after a frame has been received in the frame rate processing section 10c such that the block set of the TTI containing the frame can be reconstructed. When invoked as part of the Ncodes computation, the various TrCH parameters are used only as intermediate variables to compute Nbits.

The TrCH Parameters Determination element 14 receives as an input the output 31 from the Ncodes Computation Control which invokes its modified processing functions in the background processing section 10a. After reception of a time frame is completed, the TrCH Parameters Determination element 14 receives as an input the rxTFCI input 20 which invokes its full processing functions in the frame rate processing section 10c. In both cases, the TrCH Parameters Determination element 14 utilizes a modified TFC control input 22b which provides all of the TFC related control signals except the flag signal NcodesValid and Ncodes which are not necessary to its operation.

Full operation of the TrCH Parameters Determination element 14 includes a TFCI Validity Check which is not required for background processing. If the received TFCI does not correspond to a valid TFCI of the TFCS, the TFCI of the CCTrCH from the previous frame is used instead. If this is not available, the lowest non-zero valued valid TFCI is used instead.

The TrCH Parameters Determination element 14 computes a variety of parameters. CRC Parameters are determined based on the knowledge that:

each of the Transport Block Set Size$_i$ transport blocks of size Transport Block Size$_i$ has a CRC of length $L_i$ appended, where $L_i$ is $\{0, 8, 16, 24\}$ bits; and.
the total number of bits after CRC insertion, $X1_i$, is:

$$X1_i = \text{Transport Block Set Size}_i * (\text{Transport Block Size}_i + L_i)$$

Channel Decoding Parameters are determined by knowing that the channel coding function operates on blocks up to the following size, denoted Z:
Convolutional coding: Z=504 bits
Turbo coding: Z=5114 bits.

For the case of the total number of bits after CRC insertion, $X1_i$, is greater than Z, the data is partitioned into $C_i$ code blocks of length $K_i$ each and each code block is channel coded separately. Filler bits are added as required to the start of the first block such that all blocks are of equal length and for the unique case of turbo coded data of length less than 40, to the start of the single block. The number of code blocks, $C_i$ is: $C_i = \lceil X1_i/Z_i \rceil$. The number of bits in each code block, $K_i$, is $K_i=40$ if $X1_i<40$ and turbo coding is used or else $K_i = \lceil X1_i/C_i \rceil$. The number of filler bits in the first code block, $Y1_i$, is: $Y1_i = C_i K_i - X1_i$ For the case of no coding, the number of code blocks, $C_i$, is simply 1 and the length of the code block is simply $K_i$. The number of bits per code block after coding, $Y2_i$, is:
convolutional coding with rate ½: $Y2_i = 2*K_i + 16$
convolutional coding with rate ⅓: $Y2_i = 3*K_i + 24$
turbo coding with rate ⅓: $Y2_i = 3*K_i + 12$
no coding: $Y2_i = K_i$ Interframe Interleaving Parameters are determined based on the knowledge that the total number of bits from all $C_i$ code blocks after channel coding, $E_i$, is: $E_i = C_i * Y2_i$. The interframe interleaver consists of an array of $F_i$ columns and $N_i$, rows (the number of bits in each column), where: $N_i = \lceil E_i/F_i \rceil$. Filler bits are appended to the end of the $E_i$ bits, such that all columns of the array contain data. After appending the bits, the total number of bits for the TTI, $T_i$, is: $T_i = E_i * N_i$. Filler Bits are determined based on the knowledge that the number of filler bits is: $T_i - E_i$.

These parameters are used to compute the number of bits per TrCH$_i$ per frame before rate matching, Nbits$_i = N_i$. An output 34 provides $N_i$, or Nbits$_i$, the number of bits per frame after frame size equalization and before rate matching, for TrCH$_i$ to the Partial Discontinuous Transmission (DTX) processing element 16 and, in the case of frame rate processing in section 10c, also to the Rate Matching Determination element 18.

An additional output 35 of the TrCH Parameters Determination element 14 is provided for all of the determined parameters from the frame rate processing in section 10c such that the block set of the TTI containing the frame can be reconstructed. Preferably, from this output 35, TrCH parameters are provided of the form:

$X1_i$, number of bits for all concatenated transport blocks after CRC insertion, for TrCH$_i$.
$C_i$, number of code blocks, for TrCH$_i$.
$Y1_i$, number of code block filler bits, for TrCH$_i$.

$K_i$, number of bits per code block, before channel coding, for $TrCH_i$.

$Y2_i$, number of bits per code block, after channel coding, for $TrCH_i$.

$E_i$, number of bits per TTI before frame size equalization, for $TrCH_i$.

$T_i$, number of bits per TTI after frame size equalization, for $TrCH_i$.

The per-TTI parameters need be computed only once per TTI, not for every frame of the TTI. Also there are generally no floating/fixed point or performance issues.

The Partial DTX processing element 16 is of conventional design and computes the codes transmitted based on the number of bits per TrCH before rate matching and physical channel data. This element 16 is called in the background section 10a to perform in a modified mode as part of the Ncodes computation. It is also called after a frame has been received in the frame rate processing section 10c for its full functions to provide an output such that Physical Channel De-mapping knows which codes were transmitted and to determine the number of bits transmitted in a frame.

The Partial DTX processing element 16 receives as an input the output 31 from the Ncodes Computation Control which invokes its modified processing functions in the background processing section 10a. After reception of a time frame is completed, the Partial DTX processing element 16 receives as an input the rxTFCI input 20 and invokes its full processing functions in the frame rate processing section 10c. In both cases, the Partial DTX processing element 16 receives as an input the output 34 from the TrCH Parameters Determination element 14, the physical channel control input 24 and utilizes the modified TFC control input 22b which provides all of the TFC related control signals except the flag signal NcodesValid and Ncodes which are not necessary to its operation.

The Partial DTX proceeing element 16 has in its modified operation in the background processing section 10a provides the output 30a which produces an Ncodes value and set the associated flag NcodeValid. In its conventional full operational mode in the frame rate processing section 10c, the Partial DTX processing element 16 has an output 30b which produces value representing the number of bits per frame per CCTrCH, denoted $N_{data}$, which is used for the determination of rate matching parameters.

Although the Partial DTX processing element 16 functions in a receiver of a communication station, it is conveniently described in terms of its opposite transmitter function, e.g., the meaning of "before" and "after" are with respect to the transmitter functions. $N_{data}$, the number of bits per frame per CCTrCH, i.e. for all $TrCH_i$, after rate matching, and Sp, the spreading factor of the $p^{th}$ physical channel assigned to the CCTrCH are determined from the following:

Denote the number of data bits, which is a function of burst type, (not including TFCI or TPC bits, the number of which are found from TFCI Format and Physical Channel Map) in each code by $U_{p,sp}$. p refers to the sequence number $1 \leq p \leq P_{max}$ of this physical channel as follows: in ascending order of the timeslots in which they appear; if more than one physical channel appears in a timeslot, they shall be allocated the sequence number in order of the timeslot first and then of their channelization codes; the channelization codes shall be ordered in ascending order of the minimum spreading Factor and then channelization index (k). The second index Sp indicates the spreading factor with the possible values {16, 1}, respectively. For each code an individual minimum spreading factor $Sp_{min}$ is included in the physical channel map. Then, for $N_{data}$ one of the following values in ascending order and the identification from the set of allocated codes which codes are transmitted are determined from:

$$\{U_{1,S1_{min}}, U_{1,S1_{min}} + U_{2,S2_{min}}, \quad (1)$$
$$U_{1,S1_{min}} + U_{2,S2_{min}} + \ldots + U_{P_{max},(SP_{max})_{min}}\}$$

$$N_{data}SET1 = \left\{ N_{data} \text{ such that } \left( \min_{1 \leq y \leq l} \{RM_y\} \right) \times N_{data} - \right.$$
$$\left. puncLimit \times \sum_{x=1}^{l} RM_x \times N_x \text{ is non negative} \right\}$$

$$N_{data} = \min SET1$$

Ncodes is the number of channelization codes within SET1 so this value is determined and output when then operating in the modified mode in background processing section 10a. There are generally no floating/fixed point or performance issues.

In its conventional full operational mode in the frame rate processing section 10c the $N_{data}$ output 30b of the Partial DTX processing element 16 provides a required input for a Rate Matching Parameter Determination element 18. The Rate Matching Parameter Determination element 18 operates in a conventional manner to determine the initial, increment and decrement values used by the counters of the rate matching puncture/repeat data algorithm. Preferably, this includes $\Delta N_i$, the number of bits added due to repetition or deleted due to puncturing per frame for $TrCH_i$ that is determined from the following:

$$Z_0 = 0$$

$$Z_i = \left\lfloor \frac{\left( \left( \sum_{m=1}^{i} RM_m \times N_m \right) \times N_{data} \right)}{\sum_{m=1}^{l} RM_m \times N_m} \right\rfloor$$

$$\Delta N_i = Z_i - Z_{i-1} - N_i$$

For all uncoded and convolutionally coded and repeated turbo coded TrCHs the additional parameters:

$e\_ini_{i,f,1}$, the initial value of e, the rate matching counter, for frame f, sequence 1, $e\_plus_{i,1}$, the increment value of e, the rate matching counter, sequence 0, and $e\_minus_{i,1}$, the decrement value of e, the rate matching counter, sequence b=0, for $TrCH_i$, are determined by the Rate Matching Parameter Determination element 18 from the following:

a=2;

$X_i = N_{i,j}$;

$R = \Delta N_{i,j} \mod N_{i,j}$;

where $\Delta N_{i,j} \mod N_{i,j}$ is in the range of 0 to $N_{i,j}-1$ i.e. $-1 \mod 10 = 9$ and if $R \neq 0$ and $2 \times R \leq N_{i,j}$, then $q = \lceil N_{i,j}/R \rceil$ otherwise $q = \lceil N_i/(R-N_i) \rceil$ where q is a signed quantity such that if q is even $q' = q + gcd(|q|, F_i)/F_i$ where gcd (|q|,$F_i$) means greatest common divisor of |q| and $F_i$ and q' is not an integer, but a multiple of ⅛, otherwise q'=q; and S[|⌊x×q'⌋| mod $F_i$]= (|⌊x×q'⌋| div $F_i$) for x=0 to $F_i$−1;

so that:

e_$ini_{i,f,1}$=(a×S[P1 $F_i$(f)]×|Δ $N_i$|+1) mod (a×$N_i$);

e_$plus_{i,1}$=a×$X_i$;

e_$minus_{i,1}$=a×|Δ $N_i$|; and e_$ini_{i,f,b}$, e_$plus_{i,b}$, e_$minus_{i,b}$, for b=0; b=1,2 are unused For punctured turbo coded TrCHs, e_$ini_{i,f,b}$, the initial value of e, the rate matching counter, for frame f, sequence b, e_$plus_{i,b}$, the increment value of e, the rate matching counter, sequence b, and e_$minus_{i,b}$, the decrement value of e, the rate matching counter, sequence b, for TrCH$_i$, where index b is used to indicate systematic (b=0), $1^{st}$ parity (b=1), and $2^{nd}$ parity bit (b=2), and nMod3$_i$, number of first and/or second parity turbo coded bits in the first sequence, for TrCH$_i$, are preferably determined by the Rate Matching Parameter Determination element 18 from the following.

for b=0:

e_$ini_{i,f,b=1}$=1 (or any positive integer) for all f;

e_$plus_{i,b=1}$=0 (not used);

e_$minus_{i,b}$=0; and nMod3i=$N_i$ mod 3;

for b={1,2}:

$$\Delta N_i = \begin{cases} \lfloor \Delta N_i/2 \rfloor, b=1 \\ \lceil \Delta N_i/2 \rceil, b=2 \end{cases};$$

$X_i$=⌊$N_i$/3⌋;

q=⌊$X_i$/|Δ$N_i$|⌋ where if(q≦2), S[(3×r+b−1) mod $F_i$]=r mod 2 for r=0 to $F_i$−1 otherwise if q is even, q'=q−gcd(q, $F_i$)/$F_i$ where gcd (q, Fi) means greatest common divisor of q and $F_i$ and q' is not an integer, but a multiple of ⅛, otherwise q'=q; and r=⌈x×q'⌉mod $F_i$ and S[(3×r+b−1) mod $F_i$]=⌈x×q'⌉div $F_i$; for x=0 to $F_i$−1;

such that:

e_$ini_{i,f,b}$=(b×S[P1$F_i$(f)]×·|Δ$N_i$|+$X_i$) mod (b×$X_i$)

where if e_$ini_{i,f,b}$=0, e_$ini_{i,f,b=b×Xi}$;

e_$plus_{i,b}$=b×$X_i$; and e_$minus_{i,b}$=b×|Δ$N_i$|.

Additional parameters that are determined by the Rate Matching Parameter Determination element 18 include: $\alpha_{i,b}$, the TTI dependent offset for bit separation for a sequence b, and $\beta_{i,f}$, the frame dependent offset for bit separation for a frame f, for TrCH$_i$, are given by:

$\alpha_{i,b}$, the TTI dependent offset needed for bit separation

| TTI (ms) | α0 | α1 | α2 |
|---|---|---|---|
| 10, 40 | 0 | 1 | 2 |
| 20, 80 | 0 | 2 | 1 |

$\beta_{i,f}$, the Radio frame dependent offset needed for bit separation

| TTI (ms) | β0 | β1 | β2 | β3 | β4 | β5 | β6 | β7 |
|---|---|---|---|---|---|---|---|---|
| 10 | 0 | NA | NA | NA | NA | NA | NA | NA |
| 20 | 0 | 1 | NA | NA | NA | NA | NA | NA |
| 40 | 0 | 1 | 2 | 0 | NA | NA | NA | NA |
| 80 | 0 | 1 | 2 | 0 | 1 | 2 | 0 | 1 |

A further parameter that is determined by the Rate Matching Parameter Determination element 18 is X2$_i$, the number of bits per sequence after bit separation. For a TrCH$_i$, this is given by X2$_i$=floor($N_i$/3).

In addition to the $N_{data}$ input 30b from the Partial DTX processing element 16, the Rate Matching Parameter Determination element 18 receives as inputs the rxTFCI input 20, the $N_i$ output 34 from the TrCH Parameters element 14 and the modified TFC control input 22b which provides all of the TFC related control signals except the flag signal Ncodes-Valid and Ncodes which are not necessary to its operation.

The Rate Matching Parameter Determination element 18 provides via an the output rate matching parameters, of the form:

e_$ini_{i,f,b}$, initial value of e, the rate-matching counter, for frame f, sequence b, for TrCH$_i$.

e_$plus_{i,b}$, increment value of e, the rate-matching counter, sequence b, for TrCH$_i$.

e_$minus_{i,b}$, decrement value of e, the rate-matching counter, sequence b, for TrCH$_i$.

$X_{i,b}$, number of bits before rate matching, sequence b, for TrCH$_i$. and nMod3$_i$, number of first and/or second parity turbo coded bits in the first sequence, for TrCH$_i$.

These parameters are produced at the frame rate. Also, there are generally no floating/fixed point or performance issues.

The time slot rate processing section 10b provides fast TFCI processing to produce the list of the channelization codes by means of a Fast TFCI processing element 13. The Fast TFCI processing element 13 uses the rxTFCI as data and the previously computed values of Ncodes and other TFC parameters as control signals via inputs 20 and 22 respectively, to determine a list of transmitted codes of all CCTrCHs in the current frame. The Fast TFCI processing element 13 also includes the control Physical Channel Map input 24 and a timeslot number control input 25 since it operates per timeslot.

The list of transmitted codes for each CCTrCH, denoted CodeList, and an associated flag, preferably denoted CodeListValid, is provided via output 32 preferably to Blind Code Detection (BCD) functions of a UE or Code Decision functions of a Node B, Multi-User Detection (MUD) or Single User Detection (SUD), Physical Channel Demapping and Transmit Power Control (TPC) for a UE. If either the received TFCI or Ncodes for the received TFCI of a particular CCTrCH is not available, the list remains empty for that CCTrCH.

Figure 4:
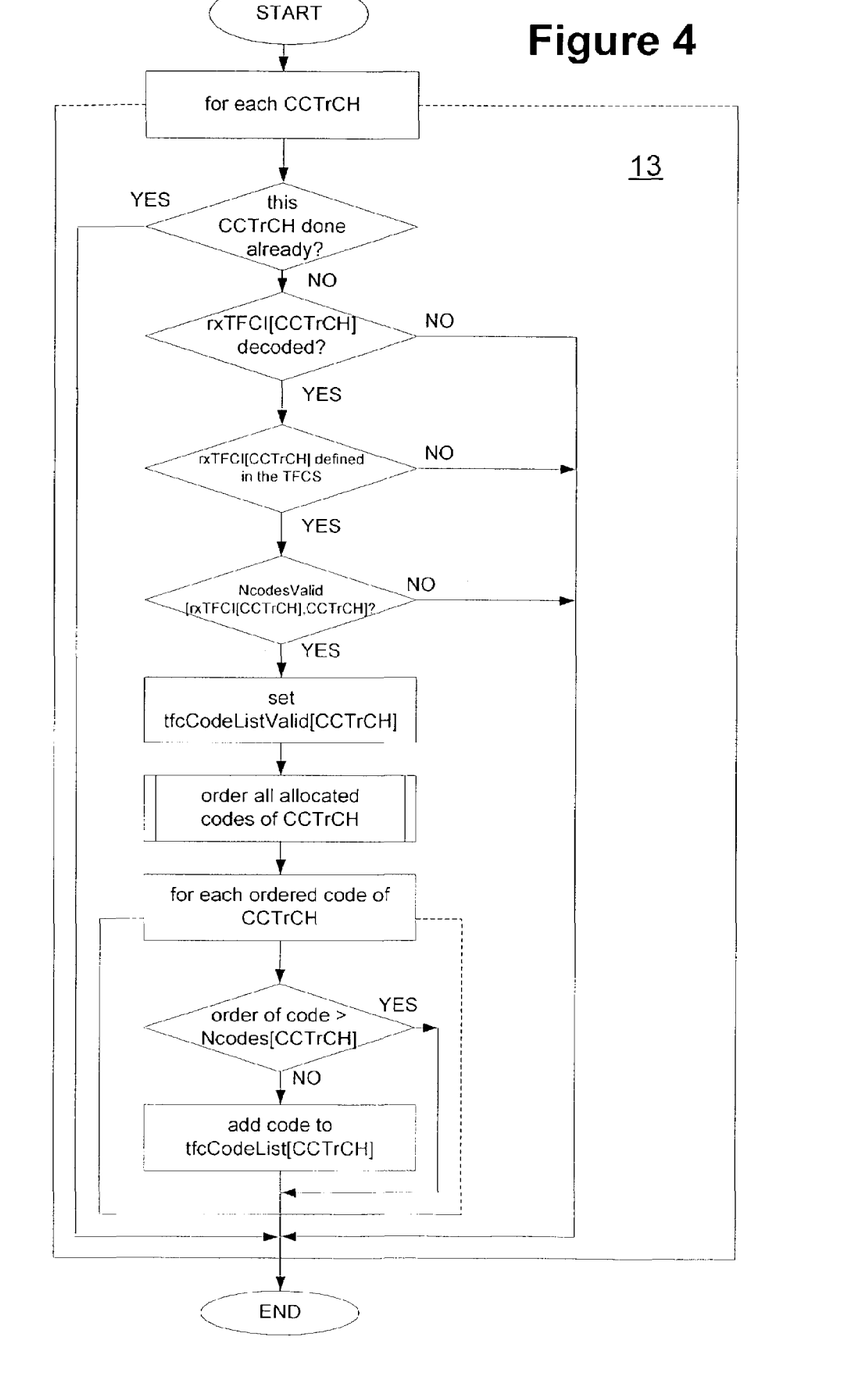
FIG. 4 is a flowchart illustrating the generation of a list of transmitted codes based on the intermediate parameter $N_{codes}$ in accordance with the teachings of the present invention.

The preferred functioning of the Fast TFCI processing element 13 is illustrated in the flow diagram of FIG. 4. The process is conducted for each CCTrCH allocated for reception in a particular time slot. An initial check is made to see if the code list for the particular CCTrCH has already been generated by checking the flag CodeListValid which is set when a code list is generated. This flag is preferably cleared at the beginning of each new TTI for a CCTrCH.

If the CCTrCH has not already been processed, the rxTFCI is checked to determine if it is decoded. If the rxTFCI of a CCTrCH has not yet been decoded, generally it is because the selected timeslot is the first timeslot in the frame of the CCTrCH. In that case, no processing of the fast TFCI is possible and no code list is output for the CCTrCH. If the rxTFCI has been decoded, a further check is conducted against the control TFC parameters to ascertain that the TFCI is a valid defined value for the TFCS of the particular CCTrCH. If not, no code list is output for the CCTrCH.

If the received TFCI of a CCTrCH has been decoded and is valid, the computed number of codes transmitted in the frame, Ncodes, is then looked up. If the number of transmitted codes of the CCTrCH, Ncodes, has already been computed, the CodeListValid flag is set for that CCTrCH and the transmitted channelization codes in the current frame are determined and output. If the number of transmitted codes has not yet been computed, no code list is output for the CCTrCH.

The list of transmitted channelization codes in the current frame for a CCTrCH is preferably determined by ordering the allocated codes of the CCTrCH first by ascending timeslot number and then by code index within each timeslot. For each code of the CCTrCH, if its order within the ordered list (ordinal number) is less than or equal to Ncodes, the channelization code is added to the transmitted code list. The processing of the channelization codes to form the code list can be stopped as soon as the channelization code is added that has an ordinal index number equal to the value of Ncodes for the CCTrCH being processed.

Once the transmitted list for a CCTrCH in a given frame has been determined, it remains fixed for the remainder of the frame. This is implemented by the initial check of the CodeListValid flag of the Fast TFCI processing element 13 as discussed above. Preferably, it is required that the transmitted code list is determined in time for use by the MUD to demodulate the next timeslot. There are generally no floating/fixed point issues.

Although the above invention has been described with reference to specific preferred parameters and implementation processes and components, it is not intended to be limited to only the preferred embodiment. Other variations will be apparent to the skilled artisan which are within the scope of the present invention.

What is claimed is:

1. A method for wireless communication comprising:
   receiving channelization coded signals on physical channels of at least one coded composite transport channel (CCTrCh) within timeslots of a system time frame;
   determining an actual number of channelization codes for the CCTrCh within the system time frame; and
   identifying the channelization codes by performing a channelization code identification algorithm based on the determined number to thereby facilitate decoding of the received signals such that the identified channelization codes are stored in a code list by first ordering all channelization codes that are allocated and selecting codes in order from the code list until the determined number of channelization codes is reached.

2. A method for wireless communication comprising:
   receiving channelization coded signals on physical channels of at least one coded composite transport channel (CCTrCH) within timeslots of a system time frame where each CCTrCH is comprised of a selected number of Transport Channels (TrCHs), each TrCH having data streams arranged in a predetermined Transport Format (TF) of a Transport Set (TFS) of that TrCH which is in effect for a given Transmission Time Interval (TTI) of timeframes and a Transport Format Indicator (TFI) that identifies the TF of the TrCH's TFS in effect for that TrCH, the TFIs of all the TrCHs of a CCTrCH being combined into a Transport Format Combination Indicator (TFCI) from which the formatting and channelization codes of the CCTrCH in a given TTI can be determined including receiving a TFCI in conjunction with a CCTrCH in a TTI;
   determining an actual number of channelization codes transmitted for the CCTrCh within the system time frame by processing the received TFCI a first time to determine a value Ncodes representing the number of transmitted channelization codes; and
   identifying the channelization codes by performing a channelization code identification algorithm based on the determined number to thereby facilitate decoding of the received signals by processing the received TFCI a second time utilizing the determined value Ncodes to identify a list corresponding to the transmitted channelization codes of the CCTrCH in the TTI.

3. The method of claim 2 wherein the received TFCI is processed to determine a value Ncodes in background processing and is processed to identify a list corresponding to the transmitted channelization codes at a timeslot processing rate.

4. The method of claim 2 wherein the received TFCI is processed to determine a value Ncodes in background processing only if a currently valid value Ncodes has not been determined, is processed to identify a list corresponding to the transmitted channelization codes at a timeslot processing rate only if a currently valid value transmitted channelization code list has not been identified, and is processed at a time frame processing rate to determine demodulation parameters.

5. The method of claim 3 wherein TFCIs and CCTrCHs are received and processed by a User Equipment (UE).

6. The method of claim 3 wherein TFCIs and CCTrCHs are received and processed by a Node B.

7. The method of claim 2 wherein TFCIs and CCTrCHs are received and processed by a User Equipment (UE).

8. The method of claim 2 wherein TFCIs and CCTrCHs are received and processed by a Node B.

9. The A communication station comprising:
   a TFCI processing component having:
      a first section configured to process received Transport Format Combination Indicators (TFCIs) to produce a value representing a number of transmitted channelization codes of a corresponding coded composite transport channel (CCTrCH); and
      a second section configured to process received TFCIs using the values produced by the first section to identify a list of the transmitted channelization codes for each corresponding CCTrCH; and
   a memory associated with the TFCI processing component such that the first section stores the produced values in the memory and the values are retrieved from the memory for use by the second section.

10. The communication station of claim 9 configured as a Node B of a 3GPP system.

11. The communication station of claim 9 configured as a User Equipment (UE) of a 3GPP system.

12. A communication station comprising a TFCI processing component having:
   a first section configured to process received Transport Format Combination Indicators (TFCIs) to produce a value representing a number of transmitted channelization codes of a corresponding coded composite transport channel (CCTrCH) in background processing such that at least 50 values can be produced in a given time frame; and a second section configured to process received TFCIs at a timeslot processing rate using the values produced by the first section to identify a list of the transmitted channelization codes for each corresponding CCTrCH.

13. The communication station of claim 12 wherein the TFCI processing component has a third section configured to process received TFCIs to produce demodulation parameters for each corresponding CCTrCH at a time frame processing rate.

14. The communication station of claim 13 further comprising a memory associated with the TFCI processing component such that the first section stores the produced values in the memory and the values are retrieved from the memory for use by the second section.

15. The communication station of claim 14 wherein the communication station is a Node B of a 3GPP system.

16. The communication station of claim 14 configured as a User Equipment (UE) of a 3GPP system.

17. A wireless communication apparatus comprising:
a receiver component configured to receive channelization coded signals on physical channels of at least one coded composite transport channel (CCTrCh) within timeslots of a system time frame;
a first circuit configured to determine an actual number of channelization codes for the CCTrCh within the system time frame;
a second circuit configured to identify the channelization codes by performing a channelization code identification algorithm using the determined number to thereby facilitate decoding of the received signals;
a memory, operatively associated with said second circuit, configured to store allocated channelization codes in order in a code list; and
said second circuit configured to select codes in order from the code list until the determined number of channelization codes is reached.

18. The wireless communication apparatus of claim 17 configured as a User Equipment (UE).

19. A wireless communication apparatus comprising: a receiver component configured to receive channelization coded signals on physical channels of at least one coded composite transport channel (CCTrCh) within timeslots of a system time frame where each CCTrCH is comprised of a selected number of Transport Channels (TrCHs), each TrCH has data streams arranged in a predetermined Transport Format (TF) of a Transport Format Set (TFS) of that TrCH which is in effect for a given Transmission Time Interval (TTI) of timeframes and a Transport Format Indicator (TFI) that identifies the TF of the TrCH's TFS in effect for that TrCH, the TFIs of all the TrCHs of a CCTrCH being combined into a Transport Format Combination Indicator (TFCI) from which the formatting and channelization codes of the CCTrCH in a given TTI can be determined;

a first circuit configured to determine an actual number of channelization codes for the CCTrCh within the system time frame by processing a received TFCI a first time to determine a value Ncodes representing the number of transmitted channelization codes; and a second circuit configured to identify the channelization codes by performing a channelization code identification algorithm using the determined number to thereby facilitate decoding of the received signals by processing the received TFCI a second time utilizing the determined value Ncodes to identify a list corresponding to the transmitted channelization codes of the CCTrCH in the TTI.

20. The wireless communication apparatus of claim 19 wherein the received TFCI is processed to determine a value Ncodes in background processing and is processed to identify a list corresponding to the transmitted channelization codes at a timeslot processing rate.

21. The wireless communication apparatus of claim 19 wherein the received TFCI is processed to determine a value Ncodes in background processing only if a currently valid value Ncodes has not been determined, is processed to identify a list corresponding to the transmitted channelization codes at a timeslot processing rate only if a currently valid value transmitted channelization code list has not been identified, and is processed at a time frame processing rate to determine demodulation parameters.

22. The wireless communication apparatus of claim 19 configured as a User Equipment (UE).

* * * * *

UNITED STATES PATENT AND TRADEMARK OFFICE
CERTIFICATE OF CORRECTION

PATENT NO. : 7,386,011 B2  Page 1 of 1
APPLICATION NO. : 10/417586
DATED : June 10, 2008
INVENTOR(S) : John W. Haim It is certified that error appears in the above-identified patent and that said Letters Patent is hereby corrected as shown below:

At column 1, line 45, before the word "mode", delete "TTD" and insert therefor --TDD--.

At column 8, line 63, after the word "upon", delete "curren3GPP" and insert therefor --current 3GPP--.

At column 11, line 43, before the word "representing", delete "value", and insert therefor --values--.

At column 13, delete line 7, and insert therefor --$e\_ini_{i,f,l} = (axS[P1_{Fi}(f)]x|\Delta N_i|+1) \mod (axN_i);$--.

At column 13, delete line 22 and insert therefor --$b = 0$:--.

At column 13, delete line 40, and insert therefor --if q is even, $q' = q-\gcd(q, F_i)/F_i$ (end of line 40); (begin line 41), where $\gcd(q,F_i)$--.

At column 13, delete line 49 and insert therefor --where if $e\_ini_{i,f,b} = 0$, $e\_ini_{i,f,b} = bxX_i$;--.

At claim 2, column 15, line 64, after the word "Transport", insert --Format--.

At claim 9, column 16, line 42, before the word "A", delete "The".

Signed and Sealed this

Twenty-third Day of September, 2008

JON W. DUDAS
*Director of the United States Patent and Trademark Office*